(12) United States Patent
Eifert et al.

(10) Patent No.: US 10,329,943 B2
(45) Date of Patent: Jun. 25, 2019

(54) SPLIT AXIAL-CENTRIFUGAL COMPRESSOR

(71) Applicants: Rolls-Royce North American Technologies, Inc., Indianapolis, IN (US); Rolls-Royce Corporation, Indianapolis, IN (US)

(72) Inventors: Andrew J. Eifert, Indianapolis, IN (US); Craig E. Heathco, Greenwood, IN (US); Robert W. Cedoz, Indianapolis, IN (US); Robert T. Duge, Carmel, IN (US)

(73) Assignees: Rolls-Royce North American Technologies Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 649 days.

(21) Appl. No.: 14/857,196

(22) Filed: Sep. 17, 2015

(65) Prior Publication Data

US 2016/0138603 A1    May 19, 2016

Related U.S. Application Data

(60) Provisional application No. 62/081,353, filed on Nov. 18, 2014.

(51) Int. Cl.
| | | |
|---|---|---|
| *F02C 3/113* | (2006.01) | |
| *F01D 15/12* | (2006.01) | |
| *F04D 17/10* | (2006.01) | |
| *F04D 19/02* | (2006.01) | |
| *F04D 25/02* | (2006.01) | |
| *F04D 25/04* | (2006.01) | |
| *F02C 7/36* | (2006.01) | |

(52) U.S. Cl.
CPC ............... *F01D 15/12* (2013.01); *F02C 7/36* (2013.01); *F04D 17/10* (2013.01); *F04D 19/02* (2013.01); *F04D 25/02* (2013.01); *F04D 25/04* (2013.01); *F05D 2260/403* (2013.01)

(58) Field of Classification Search
CPC ................................ F01D 15/12; F04D 19/02
See application file for complete search history.

(56) References Cited

U.S. PATENT DOCUMENTS

| | | | |
|---|---|---|---|
| 3,152,443 A | 10/1964 | Newland | |
| 3,182,898 A | 5/1965 | Hewson | |
| 3,357,176 A | 12/1967 | Williams | |
| 3,546,880 A * | 12/1970 | Schwaar | ................... F02C 3/08 |
| | | | 415/143 |
| 3,754,484 A | 8/1973 | Roberts | |
| 3,971,208 A | 7/1976 | Schwent | |
| 4,064,690 A * | 12/1977 | Kronogard | .............. F02C 3/103 |
| | | | 60/39.163 |
| 4,147,473 A | 4/1979 | Bufalov et al. | |
| 4,214,440 A | 7/1980 | Rucker | |
| 4,219,306 A | 8/1980 | Fujino et al. | |

(Continued)

*Primary Examiner* — Kayla McCaffrey
(74) *Attorney, Agent, or Firm* — Barnes & Thornburg LLP

(57) ABSTRACT

A gas turbine engine including a compressor, a turbine, and a variable-ratio unit is disclosed. The turbine is coupled to the compressor to drive rotation of multiple stages of the compressor. The variable-ratio unit is configured to transmit rotational power from the turbine to at least one stage of the compressor to drive rotation of the at least one stage of the compressor.

16 Claims, 2 Drawing Sheets

(56) References Cited

U.S. PATENT DOCUMENTS

| | | | |
|---|---|---|---|
| 5,611,663 | A | 3/1997 | Kotzur |
| 6,158,210 | A | 12/2000 | Orlando |
| 7,784,260 | B2 | 8/2010 | Spalton |
| 8,083,030 | B2 | 12/2011 | Portlock |
| 8,181,442 | B2 * | 5/2012 | Youssef .................. F02C 3/113 60/226.1 |
| 8,209,952 | B2 | 7/2012 | Ress, Jr. |
| 8,231,341 | B2 | 7/2012 | Anderson et al. |
| 8,337,148 | B2 | 12/2012 | Staubach et al. |
| 8,561,383 | B2 | 10/2013 | Suciu et al. |
| 9,752,500 | B2 * | 9/2017 | Ullyott .................... F02C 3/113 |
| 2010/0000198 | A1 * | 1/2010 | Talan ........................ F02C 7/36 60/39.24 |
| 2010/0037623 | A1 | 2/2010 | Jewess et al. |
| 2012/0192570 | A1 | 8/2012 | McCune et al. |
| 2013/0000322 | A1 | 1/2013 | Silkowski |
| 2013/0102431 | A1 | 4/2013 | Doleschel et al. |
| 2013/0219859 | A1 | 8/2013 | Suciu et al. |
| 2013/0223984 | A1 | 8/2013 | Gehlot et al. |
| 2016/0138603 | A1 | 5/2016 | Eifert et al. |

* cited by examiner

SPLIT AXIAL-CENTRIFUGAL COMPRESSOR

CROSS REFERENCE TO RELATED APPLICATIONS

This application claims priority to and the benefit of U.S. Provisional Patent Application No. 62/081,353, filed 18 Nov. 2014, the disclosure of which is now expressly incorporated herein by reference.

FIELD OF THE DISCLOSURE

The present disclosure relates generally to gas turbine engines, and more specifically to compressors of gas turbine engines.

BACKGROUND

Gas turbine engines typically include a compressor, a combustor, and a turbine. The compressor compresses air drawn into the engine and delivers high pressure air to the combustor. In the combustor, fuel is mixed with the high pressure air and the air/fuel mixture is ignited. Products of the combustion reaction in the combustor are directed into the turbine where work is extracted to drive various components of the gas turbine engine, such as the compressor.

In some gas turbine engines, multiple stages of the compressor are driven at a single rotational speed by the turbine. Because each stage of the compressor is not driven at its individual optimal rotational speed by the turbine, these gas turbine engines present operating efficiency limitations. In other gas turbine engines, multiple stages of the compressor are driven by separate turbine units at different rotational speeds. Due to the multiple turbine units used to drive each compressor stage, such gas turbine engines present cost and complexity limitations. In still other gas turbine engines, multiple stages of the compressor are driven by separate turbine units at different rotational speeds, and one of the rotational speeds is dependent upon the rotational speed of the output shaft of the gas turbine engine. Such gas turbine engines present stability problems that may necessitate additional features that increase cost and/or reduce operating efficiency of the gas turbine engines.

SUMMARY

The present disclosure may comprise one or more of the following features and combinations thereof.

A gas turbine engine may include a compressor, a turbine, and a variable-ratio unit. The compressor may include an axial compression stage and a centrifugal compression stage arranged aft of the axial compression stage along an engine axis. The turbine may be arranged aft of the centrifugal compression stage and coupled to the compressor to drive rotation of the axial compression stage and the centrifugal compression stage about the engine axis. The variable-ratio unit may be coupled to the turbine and the compressor and configured to transmit rotational power generated by the turbine about the engine axis to at least one of the axial compression stage and the centrifugal compression stage to drive rotation of the at least one of the axial compression stage and the centrifugal compression stage at various speeds offset from a turbine speed. The axial compression stage may have an outlet radius and the centrifugal compression stage may have an inlet radius that is about equal to the outlet radius of the axial compression stage to facilitate a smooth transition of air from the axial compression stage to the centrifugal compression stage.

In some embodiments, the variable-ratio unit may be included in an infinitely variable transmission. The variable-ratio unit may include one of a toroidal variator and a planetary-type ball variator.

In some embodiments, the centrifugal compression stage may be coupled to the turbine for common rotation therewith about the engine axis, and the axial compression stage may be coupled to the turbine through the variable-ratio unit for rotation about the engine axis at the various speeds offset from the turbine speed. The variable-ratio unit may be arranged forward of the axial compression stage about the engine axis. The gas turbine engine may include a thrust bearing supporting a portion of the variable-ratio unit and arranged forward of the axial compression stage.

In some embodiments, the axial compression stage may be coupled to the turbine for common rotation therewith about the engine axis, and the centrifugal compression stage may be coupled to the turbine through the variable-ratio unit for rotation about the engine axis at the various speeds offset from the turbine speed. The variable-ratio unit may be arranged aft of the centrifugal compression stage about the engine axis.

In some embodiments, the gas turbine engine may include a second variable-ratio unit coupled to the turbine and the compressor. The axial compression stage may be coupled to the turbine through the variable-ratio unit for rotation about the engine axis at the various speeds offset from the turbine speed. The centrifugal compression stage may be coupled to the turbine through the second variable-ratio unit for rotation about the engine axis at a plurality of speeds offset from the various speeds and the turbine speed. The variable-ratio unit may be arranged forward of the axial compression stage about the engine axis, and the second variable-ratio unit may be arranged aft of the centrifugal compression stage about the engine axis.

According to another aspect of the present disclosure, a compressor may include an axial compression stage, a centrifugal compression stage, and a variable-ratio unit. The axial compression stage may have an axial inlet and an axial outlet. The centrifugal compression stage may have a centrifugal inlet and a centrifugal outlet. The variable-ratio unit may be adapted to receive rotational power and distribute the rotational power between the axial compression stage and the centrifugal compression stage. The variable-ratio unit may include an input and an output coupled between the input and one of the axial compression stage and the centrifugal compression stage. The centrifugal inlet may be arranged to receive compressed air discharged from the axial outlet and may have a first area about equal to a second area of the axial outlet.

In some embodiments, the variable-ratio unit may be included in an infinitely variable transmission. The variable-ratio unit may include one of a toroidal variator and a planetary-type ball variator.

In some embodiments, the axial compression stage may be arranged forward of the centrifugal compression stage, and the variable-ratio unit may be arranged forward of the axial compression stage. The compressor may include a thrust bearing arranged forward of the axial compression stage and supporting a portion of the variable-ratio unit.

In some embodiments, the axial compression stage may be arranged forward of the centrifugal compression stage, and the variable-ratio unit may be arranged aft of the centrifugal compression stage. Additionally, in some embodiments, the compressor may include a second variable-ratio unit. The second variable-ratio unit may include an input and an output coupled between the input and the other of the axial compression stage and the centrifugal compression stage. The compressor may include a first thrust bearing supporting a portion of the variable-ratio unit, and a second thrust bearing supporting a portion of the second variable-ratio unit. In some embodiments yet still, each of the variable-ratio unit and the second variable-ratio unit may be included in an infinitely variable transmission. Finally, in some embodiments, each of the variable-ratio unit and the second variable-ratio unit may include one of a toroidal variator and a planetary-type ball variator.

These and other features of the present disclosure will become more apparent from the following description of the illustrative embodiments.

DETAILED DESCRIPTION OF THE DRAWINGS

Figure 1:
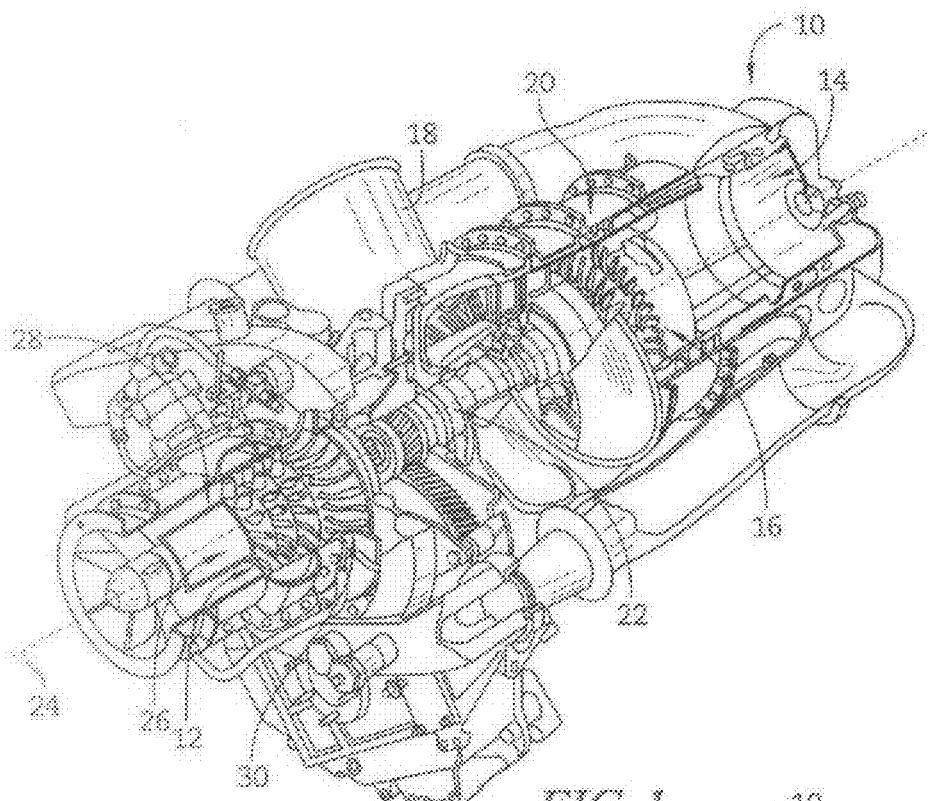
FIG. 1 is a cut-away perspective view of a gas turbine engine.

For the purposes of promoting an understanding of the principles of the disclosure, reference will now be made to a number of illustrative embodiments illustrated in the drawings and specific language will be used to describe the same.

Referring now to FIG. 1, a cut-away view of an illustrative aerospace gas turbine engine 10 is shown. The gas turbine engine 10 includes a compressor 12, a combustor 14, a turbine 16, and an exhaust 18, each of which is supported by a metallic case 20. The compressor 12 compresses and delivers air to the combustor 14. The combustor 14 mixes the compressed air with fuel, ignites the air/fuel mixture, and delivers the combustion products (i.e., hot, high-pressure gases) to the turbine 16. The turbine 16 converts the combustion products to mechanical energy (i.e., rotational power) that drives, among other things, the compressor 12. The exhaust 18 discharges the used combustion products to the atmosphere.

Rotating components of the compressor 12 and the turbine 16 are mounted on a shaft 22 as shown in FIG. 1. The compressor 12 and the turbine 16 are coupled to one another through the shaft 22 so that the power extracted by the turbine 16 is transmitted to the compressor 12 via the shaft 22. The shaft 22 defines an engine axis 24 along which each of the compressor 12, the combustor 14, and the turbine 16 are arranged as shown in FIG. 1. The turbine 16 is arranged aft of the compressor 12 along the axis 24. In the illustrative embodiment, both the turbine 16 and the compressor 12 are arranged forward of the combustor 14 along the axis 24 as shown in FIG. 1.

Figure 2:
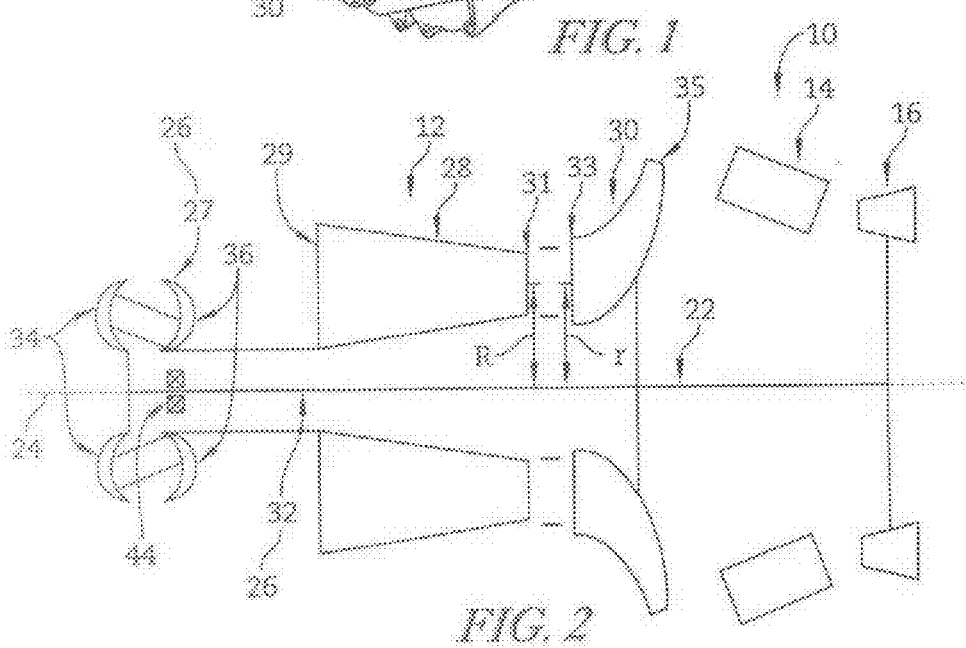
FIG. 2 is a diagrammatic view of the gas turbine engine of FIG. 1 showing axial and centrifugal stages of a compressor of the gas turbine engine and a variable-ratio unit of the gas turbine engine arranged along an engine axis.

The gas turbine engine 10 further includes a transmission 26 that is positioned along the engine axis 24 as shown in FIG. 1. As best seen in FIG. 2, the transmission 26 is coupled to the turbine 16 and the compressor 12 via the shaft 22. The transmission 26 is configured to transmit rotational power generated by the turbine 16 about the engine axis 24 to at least one stage of the compressor 12. Specifically, the transmission 26 is configured to transmit rotational power from the turbine 16 at various speeds offset from a rotational speed of the turbine 16 (i.e., a "turbine speed") to at least one stage of the compressor 12. As a result, at least one stage of the compressor 12 is driven by the turbine 16 through the transmission 26 to rotate at the various speeds. In this way, the transmission 26 is adapted to receive rotational power from the turbine 16 and distribute the rotational power between multiple stages of the compressor 12.

The illustrative transmission 26 is a continuously variable transmission (CVT) that is embodied as, or otherwise includes, a variable-ratio unit 27 as shown in FIG. 2. The variable-ratio unit 27 is configured to receive rotational power from the turbine 16 at an input 34 and produce rotational power at the various speeds offset from the turbine speed at an output 36. From the output 36, rotational power at the various speeds is transmitted to at least one stage of the compressor 12 to drive rotation of at least one stage of the compressor 12 at the various speeds. In this way, the variable-ratio unit 27 is adapted to receive rotational power from the turbine 16 and distribute the rotational power between multiple stages of the compressor 12.

The compressor 12 illustratively includes a plurality of axial compression stages 28 and a centrifugal compression stage 30 arranged aft of the axial compression stages 28 along the axis 24 as shown in FIG. 2. Air compressed by the axial compression stages 28 is delivered to the centrifugal compression stage 30 for further compression. Air compressed by the centrifugal compression stage 30 is then delivered to the combustor 14.

The turbine 16 is coupled to the axial compression stages 28 and the centrifugal compression stage 30 through the shaft 22 to drive rotation of the axial stages 28 and the centrifugal stage 30 as suggested in FIG. 2. In the illustrative embodiment, the centrifugal compression stage 30 is directly driven by the shaft 22 at the turbine speed. The axial stages 28 are indirectly driven by the shaft 22 through the variable-ratio unit 27 such that the turbine 16 drives rotation of the axial stages 28 at the various speeds offset from the turbine speed.

The aft-most stage of the axial compression stages 28 has an axial inlet 29 and an axial outlet 31 arranged opposite the axial inlet 29 as shown diagrammatically in FIG. 2. The axial outlet 31 illustratively has a radius R measured from the axis 24 as shown in FIG. 2, and the axial outlet 31 has a first area. The centrifugal compression stage 30 has a centrifugal inlet 33 and a centrifugal outlet 35 arranged opposite the centrifugal inlet 33. The centrifugal inlet 33 illustratively has a radius r measured from the axis 24 as shown in FIG. 2, and the centrifugal inlet 33 has a second area. The centrifugal inlet 33 is arranged to receive compressed air discharged from the axial outlet 31.

The axial outlet 31 radius R is about equal to the centrifugal inlet 33 radius r as shown in FIG. 2. In the illustrative embodiment, the first area of the axial outlet 31 is about equal to the second area of the centrifugal inlet 33. As such, the axial outlet 31 and the centrifugal inlet 33 cooperate to facilitate a smooth transition of air from the aft-most axial compression stage 28 to the centrifugal compression stage 30. The smooth transition of air from the aft-most axial stage 28 to the centrifugal stage 30 reduces lost performance within the engine 10 and thereby increases the operating efficiency of the engine 10.

The variable-ratio unit 27 is illustratively arranged forward of the axial compression stages 28 along the axis 24 as shown in FIG. 2. The axial compression stages 28 are coupled to the turbine 16 through the variable-ratio unit 27 for rotation about the engine axis 24 at the various speeds offset from the turbine speed. The centrifugal compression stage 30 is coupled to the turbine 16 for common rotation therewith about the engine axis 24 (i.e., at the turbine speed).

In addition to the variable-ratio unit 27, the transmission 26 illustratively includes an input shaft 32. The variable-ratio unit 27 is coupled between the input shaft 32 and the axial stages 28 as shown in FIG. 2. The input shaft 32 is illustratively embodied as a portion of the shaft 22 configured to transmit rotational power from the turbine 16 to the variable-ratio unit 27. The variable-ratio unit 27 is illustratively embodied as, or otherwise includes, a toroidal variator. As such, the input 34 of the variable-ratio unit 27 embodies or otherwise includes one or more toroidal-shaped input discs, and the output 36 of the variable-ratio unit 27 embodies or otherwise includes one or more toroidal-shaped output discs. The output 36 is coupled between the input 34 and the axial compression stages 28 as shown in FIG. 2.

In other embodiments, the variable-ratio unit 27 may be embodied as, or otherwise include, a planetary-type ball variator. In other embodiments still, the variable-ratio unit 27 may include a planetary gear set and an electric motor or generator. To produce rotational power at the various speeds, the electric motor or generator may supply power to the planetary gear set to modulate the rotational speed of one or more components of the planetary gear set during operation of the variable-ratio unit 27. For instance, the electric motor or generator may be used to modulate the rotational speed of one or more of a ring gear, a sun gear, or a carrier of the planetary gear set to produce rotational power at the various speeds.

The transmission 26 may further include a planetary gear set (not shown) coupled between the input shaft 32 and the aft-most axial compression stage 28. The planetary gear set may be a simple epicylic or planetary gear set, or a compound planetary gear set such as a meshed-planet planetary gear set or a stepped-planet planetary gear set. In addition, the planetary gear set may be a helical gear set, or the planetary gear set may include straight-toothed gears. The variable-ratio unit 27 and the planetary gear set may cooperate to transmit rotational power from the turbine 16 to the axial compression stages 28 at the various speeds offset from the turbine speed. The various speeds may include a zero output speed (i.e., received by the axial stages 28) produced in response to a non-zero input speed (i.e., received by the input shaft 32). In that way, the transmission 26 may be embodied as, or otherwise include, an infinitely variable transmission (IVT).

The transmission 26 may further include a plurality of torque transmitting mechanisms, such as clutches, selectively engageable in combination with one another to select different transmission operating modes. In one example, the torque transmitting mechanisms may be pneumatically or hydraulically controlled. To select one of the different transmission operating modes, a manually or electronically-operated shift selector may be provided. The shift selector may provide inputs to an electronic control unit. In response to receiving the inputs, the electronic control unit may direct an electro-pneumatic or electro-hydraulic control system to control the engagement of the torque transmitting mechanisms to select one of the transmission operating modes. For instance, the electronic control unit may provide electrical signals to solenoid valves of an electro-pneumatic or electro-hydraulic control system to control the engagement of the torque transmitting mechanisms.

In any case, during operation of the gas turbine engine 10, the variable-ratio unit 27 produces thrust loads parallel to the engine axis 24. To bear the thrust loads produced by the variable-ratio unit 27, and to support at least a portion of the variable-ratio unit 27 about the input shaft 32, the engine 10 includes a thrust bearing 44. The thrust bearing 44 may also bear thrust loads parallel to the engine axis 24 produced by other components of the gas turbine engine 10, such as the compressor 12 and the turbine 16. The thrust bearing 44 is illustratively arranged forward of axial stages 28 between the variable-ratio unit 27 and the input shaft 32 as shown in FIG. 2. The thrust bearing 44 may be a thrust ball bearing, a thrust spherical roller bearing, a thrust cylindrical roller bearing, a thrust tapered roller bearing, or a thrust needle roller bearing, or any other suitable thrust bearing.

In the illustrative arrangement shown in FIG. 2, the thrust bearing 44 may react against the thrust load experienced by certain components of the engine 10 during operation of the engine 10. Specifically, the thrust bearing 44 may absorb thrust loads produced by the variable-ratio unit 27, the compressor 12, and the turbine 16 that would otherwise be reacted through the shaft 22 to bearings supporting the shaft 22. The operational life of such components, therefore, may be increased as a result of the arrangement of FIG. 2.

During operation of the engine 10, the variable-ratio unit 27 may produce a thrust load in one direction opposite the direction of a thrust load produced by another component of the engine 10. For instance, the variable-ratio unit 27 may produce a thrust load in one direction opposite the direction of a thrust load produced by the compressor 12 or the turbine 16. The opposing thrust loads may reduce the overall thrust load reacted through the shaft 22 to the bearings supporting the shaft 22. In this fashion, the thrust load experienced by the bearings supporting the shaft 22 may be reduced.

Figure 3:
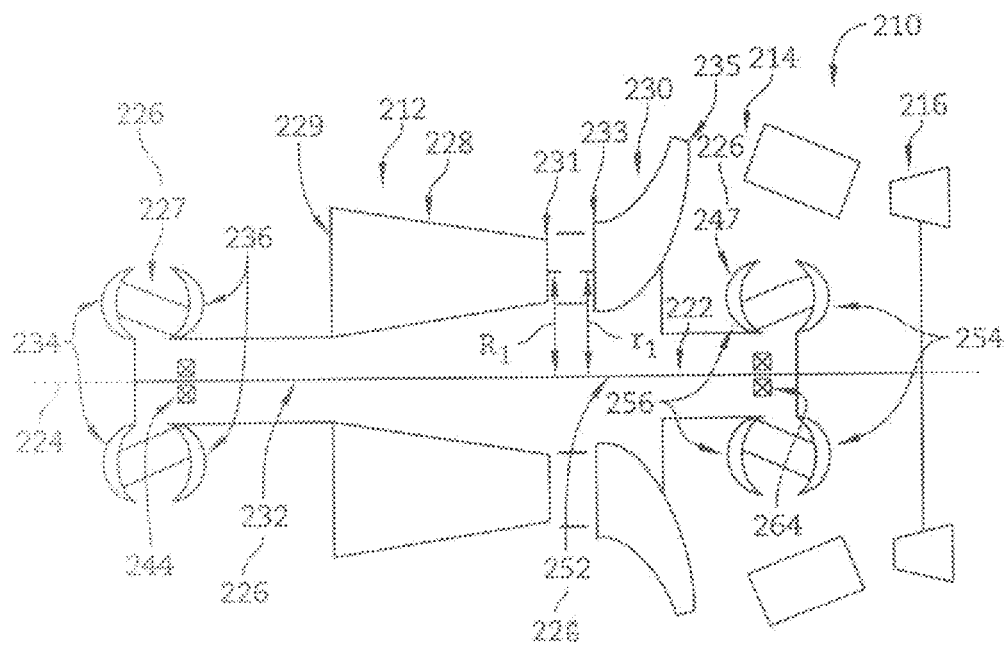
FIG. 3 is a diagrammatic view of another embodiment of a gas turbine engine showing axial and centrifugal stages of a compressor of the gas turbine engine and two variable-ratio units of the gas turbine engine arranged along an engine axis.

Referring now to FIG. 3, another embodiment of a gas turbine engine 210 is shown. The gas turbine engine 210 is similar to the gas turbine engine 10 shown in FIGS. 1-2 and described herein. However, unlike the gas turbine engine 10, the gas turbine engine 210 includes a transmission 226 that has a second variable-ratio unit 247.

The transmission 226 of the engine 210 of FIG. 3 is configured to transmit rotational power from the turbine 16 to the axial compression stages 28 and the centrifugal compression stage 30. The axial stages 28 are coupled to the turbine 16 through the transmission 226 for rotation about the axis 24 at various speeds offset from the turbine speed. The centrifugal compression stage 30 is coupled to the turbine 16 through the transmission 226 for rotation about the axis 24 at a plurality of speeds offset from the various speeds and the turbine speed.

The illustrative transmission 226 of FIG. 3 is a continuously variable transmission that is embodied as, or otherwise includes, the variable-ratio units 27, 247. The variable-ratio unit 247 is coupled to the turbine 16 and the compressor 12 and arranged aft of the centrifugal compression stage 30 along the axis 24 as shown in FIG. 3. The variable-ratio unit 247 is configured to receive rotational power from the turbine 16 at an input 254 and produce rotational power at the plurality of speeds offset from the various speeds and the turbine speed at an output 256. The output 256 is coupled to the centrifugal stage 30. In this way, the centrifugal compression stage 30 is coupled to the turbine 16 through the second variable-ratio unit 247 for rotation about the engine axis 24 at the plurality of speeds.

In addition to the variable-ratio unit 247, the transmission 226 illustratively includes an input shaft 252. The variable-ratio unit 247 is coupled between the input shaft 252 and the centrifugal compression stage 30 as shown in FIG. 3. The input shaft 252 is illustratively embodied as a portion of the shaft 22 configured to transmit rotational power from the turbine 16 to the variable-ratio unit 247. The variable-ratio unit 247 is illustratively embodied as, or otherwise includes, a toroidal variator. As such, the input 254 of the variable-ratio unit 247 embodies or otherwise includes one or more toroidal-shaped input discs, and the output 256 of the variable-ratio unit 247 embodies or otherwise includes one or more toroidal-shaped output discs. The output 256 is coupled between the input 254 and the centrifugal compression stage 30 as shown in FIG. 3.

In other embodiments, the variable-ratio unit 247 may be embodied as, or otherwise include, a planetary-type ball variator. In other embodiments still, the variable-ratio unit 247 may include a planetary gear set and an electric motor or generator. To produce rotational power at the plurality of speeds, the electric motor or generator may supply power to the planetary gear set to modulate the rotational speed of one or more components of the planetary gear set during operation of the variable-ratio unit 247. For instance, the electric motor or generator may be used to modulate the rotational speed of one or more of a ring gear, a sun gear, or a carrier of the planetary gear set to produce rotational power at the plurality of speeds.

The transmission 226 may further include a planetary gear set (not shown) coupled between the input shaft 252 and the centrifugal compression stage 30. The planetary gear set may be a simple epicylic or planetary gear set, or a compound planetary gear set such as a meshed-planet planetary gear set or a stepped-planet planetary gear set. In addition, the planetary gear set may be a helical gear set, or the planetary gear set may include straight-toothed gears. The variable-ratio unit 247 and the planetary gear set may cooperate to transmit rotational power from the turbine 16 to the centrifugal compression stage 30 at the plurality of speeds offset from the various speeds and the turbine speed. The plurality of speeds may include a zero output speed (i.e., received by the centrifugal stage 30) produced in response to a non-zero input speed (i.e., received by the input shaft 252). In that way, the transmission 226 may be embodied as an infinitely variable transmission (IVT).

In any case, during operation of the gas turbine engine 210, the variable-ratio unit 247 produces thrust loads parallel to the engine axis 24. To bear the thrust loads produced by the variable-ratio unit 247, and to support at least a portion of the variable-ratio unit 247 about the input shaft 252, the engine 210 includes a second thrust bearing 264. The thrust bearing 264 may also bear thrust loads parallel to the engine axis 24 produced by other components of the gas turbine engine 210, such as the turbine 16. The thrust bearing 264 is illustratively arranged aft of the centrifugal compression stage 30 between the variable-ratio unit 247 and the input shaft 252 as shown in FIG. 3. The thrust bearing 264 may be a thrust ball bearing, a thrust spherical roller bearing, a thrust cylindrical roller bearing, a thrust tapered roller bearing, or a thrust needle roller bearing, or any other suitable thrust bearing.

Figure 4:
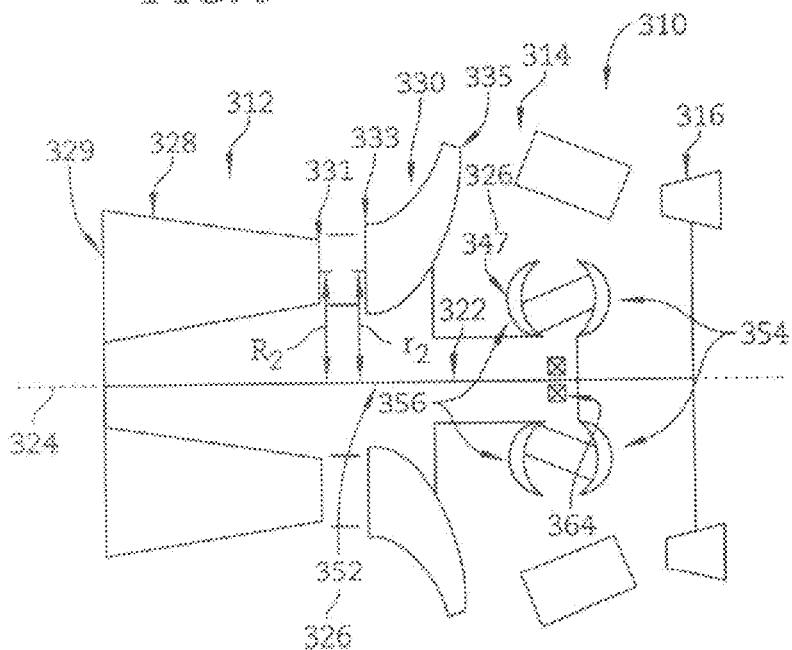
FIG. 4 a diagrammatic view of yet another embodiment of a gas turbine engine showing axial and centrifugal stages of a compressor of the gas turbine engine and a variable-ratio unit of the gas turbine engine arranged along an engine axis.

Referring now to FIG. 4, yet another embodiment of a gas turbine engine 310 is shown. The gas turbine engine 310 is similar to the gas turbine engine 10 shown in FIGS. 1-2. However, unlike the gas turbine engine 10, the gas turbine engine 310 includes a transmission 326 that has only a variable-ratio unit 347.

The transmission 326 of the engine 310 is configured to transmit rotational power from the turbine 16 to only the centrifugal compression stage 30 while the axial stages 28 are directly driven by the turbine 16. As shown in FIG. 4, the axial compression stages 28 are coupled to the turbine 16 through the shaft 22 for common rotation therewith about the axis 24. The centrifugal compression stage 30 is coupled to the turbine 16 through the transmission 326 for rotation about the axis 24 at the various speeds offset from the turbine speed.

The transmission 326 of the gas turbine engine 310 includes the input shaft 352 and the variable-ratio unit 347 as shown in FIG. 4. The variable-ratio unit 347 is coupled between the input shaft 352 and the centrifugal compression stage 30. The variable-ratio unit 347 is illustratively arranged aft of the centrifugal compression stage 30 along the axis 24. The variable-ratio unit 347 is illustratively embodied as, or otherwise includes, a toroidal variator. As such, the input 354 of the variable-ratio unit 347 embodies or otherwise includes one or more toroidal-shaped input discs, and the output 356 of the variable-ratio unit 347 embodies or otherwise includes one or more toroidal-shaped output discs. The output 356 is coupled between the input 354 and the centrifugal compression stage 30 as shown in FIG. 4.

In other embodiments, the variable-ratio unit 347 may be embodied as, or otherwise include, a planetary-type ball variator. In other embodiments still, the variable-ratio unit 347 may include a planetary gear set and an electric motor or generator. To produce rotational power at the plurality of speeds, the electric motor or generator may supply power to the planetary gear set to modulate the rotational speed of one or more components of the planetary gear set during operation of the variable-ratio unit 347. For instance, the electric motor or generator may be used to modulate the rotational speed of one or more of a ring gear, a sun gear, or a carrier of the planetary gear set to produce rotational power at the plurality of speeds.

The transmission 326 may further include a planetary gear set (not shown) coupled between the input shaft 352 and the centrifugal compression stage 30. The planetary gear set may be a simple epicylic or planetary gear set, or a compound planetary gear set such as a meshed-planet planetary gear set or a stepped-planet planetary gear set. In addition, the planetary gear set may be a helical gear set, or the planetary gear set may include straight-toothed gears. The variable-ratio unit 347 and the planetary gear set may cooperate to transmit rotational power from the turbine 16 to the centrifugal compression stage 30 at the various speeds offset from the turbine speed. The various speeds may include a zero output speed (i.e., received by the centrifugal stage 30) produced in response to a non-zero input speed (i.e., received by the input shaft 352). In that way, the transmission 326 may be embodied as an infinitely variable transmission (IVT).

The designs 10, 210, 310 of the present disclosure may improve the efficiency of a gas turbine engine compressor 12. Designs 10, 210, 310 of the present disclosure may be constructed of a forward section of axial stages 28 preceding an aft centrifugal stage 30. The forward stages 28 would operate at a different speed than the centrifugal stage 30 by means of a transmission 26, 226, 326.

The foregoing designs provide a method of improving efficiency and stability for a compressor in a gas turbine engine with a multi-stage compressor with a single speed input that operates various sections of the compressor at different speeds through the use of one or more transmissions.

In some embodiments in which a set of axial compressor stages are used in combination with a centrifugal stage to form a complete compressor section for the engine, the outer radius of the centrifugal stage may be noticeably larger than the outer radii of the axial stages causing problematic flow properties. The optimal or ideal speed of the centrifugal stage may also be significantly different than the optimal or ideal speed of the axial stages, so the engine speed is a compromise such that optimal engine efficiency is not achieved.

In some embodiments, the axial stages and the centrifugal stage may be driven by separate "lower pressure" (LP) and "higher pressure" (HP) turbines. This may permit the compressor stages to operate closer to their optimal or ideal rotation speeds but may also add complexity and cost to the engine. According to the present disclosure, the compressor may be constructed so that the axial stages will rotate at different speeds than the centrifugal stage by means of a multi-ratio gearbox or a variable ratio transmission (sometimes called a continuously variable transmission, CVT).

In some axial-centrifugal compressors, the speed is determined such that the axial section, the centrifugal section, or both are operating at a non-optimal speed for maximum efficiency. This may be caused by the aerodynamic shape of the two sections. The centrifugal section may require the input end to be at a significantly smaller radius than the output end such that centrifugal force of the rotation can impart energy into the gas stream and raise the pressure of the gas. To maximize the axial section efficiency, the axial section may match the radius of the input end such that the transition between the two sections has low pressure loss and matches the desired radius of the aerodynamics of the axial stage(s). In the common axial-centrifugal compressor, this may result in either a transition with notable pressure loss, or a combination that optimizes neither the axial compressor nor the transition. The present disclosure may improve the efficiency of the compressor by enabling an optimal axial section and an optimal centrifugal section to be combined with an optimal transition.

The engine 10 shown in FIGS. 1 and 2 constitutes an arrangement with one of more turbine stages driving a centrifugal compressor section with a single centrifugal compressor via a direct speed drive (a shaft section), and driving an axial compressor section via a multi-speed (multi-ratio) transmission section. The rotational speeds of the turbine and centrifugal compressor sections will vary throughout the operating range of the engine. The rotational speed of the axial stages of the compressor will vary throughout the operating range of the engine consistent with the varying ratio of the transmission.

The engine 210 shown in FIG. 3 constitutes an arrangement with one of more turbine stages driving a single centrifugal compressor via a multi-speed (multi-ratio) transmission section and driving an axial compressor section via a multi-speed (multi-ratio) transmission section. The rotational speeds of the turbine will vary throughout the operating range of the engine. The rotational speeds of the axial stages of the compressor and of the centrifugal stage of the compressor will vary throughout the operating range of the engine consistent with the varying ratios of their individual transmissions.

The engine 310 shown in FIG. 4 constitutes an arrangement with one or more turbine stages driving a centrifugal compressor section with a single centrifugal compressor via a multi-speed (multi-ratio) transmission section and driving an axial compressor section via a direct speed drive (a shaft section). The rotational speeds of the turbine and the axial compressor sections will vary throughout the operating range of the engine. The rotational speed of the centrifugal stage of the compressor will vary throughout the operating range of the engine consistent with the varying ratio of the transmission.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A gas turbine engine comprising
a compressor including an axial compression stage and a centrifugal compression stage arranged aft of the axial compression stage along an engine axis,
a turbine arranged aft of the centrifugal compression stage and coupled to the compressor to drive rotation of the axial compression stage and the centrifugal compression stage about the engine axis, and
a variable-ratio unit coupled to the turbine and the compressor, the variable-ratio unit configured to transmit rotational power generated by the turbine about the engine axis to the axial compression stage to drive rotation of the axial compression stage at various speeds offset from a turbine speed,
wherein the axial compression stage has an outlet radius and the centrifugal compression stage has an inlet radius that is about equal to the outlet radius of the axial compression stage to facilitate a smooth transition of air from the axial compression stage to the centrifugal compression stage, the centrifugal compression stage is coupled to the turbine for common rotation therewith about the engine axis, and the variable-ratio unit is arranged forward of the axial compression stage about the engine axis.

2. The gas turbine engine of claim 1, wherein the variable-ratio unit is included in an infinitely variable transmission.

3. The gas turbine engine of claim 2, wherein the variable-ratio unit includes one of a toroidal variator and a planetary ball variator.

4. The gas turbine engine of claim 1, further comprising a thrust bearing supporting a portion of the variable-ratio unit and arranged forward of the axial compression stage.

5. A compressor comprising
an axial compression stage having an axial inlet and an axial outlet,
a centrifugal compression stage having a centrifugal inlet and a centrifugal outlet, and
a variable-ratio unit adapted to receive rotational power and distribute the rotational power between the axial compression stage and the centrifugal compression stage, the variable-ratio unit including an input and an output, the output coupled between the input and one of the axial compression stage and the centrifugal compression stage,
wherein the centrifugal inlet is arranged to receive compressed air discharged from the axial outlet and has a first area about equal to a second area of the axial outlet, the axial compression stage is arranged forward of the centrifugal compression stage, and the variable-ratio unit is arranged forward of the axial compression stage.

6. The compressor of claim 5, wherein the variable-ratio unit is included in an infinitely variable transmission.

7. The compressor of claim 6, wherein the variable-ratio unit includes one of a toroidal variator and a planetary ball variator.

8. The compressor of claim 5, further comprising a thrust bearing being arranged forward of the axial compression stage and supporting a portion of the variable-ratio unit.

9. The compressor of claim 5, further comprising a second variable-ratio unit, the second variable-ratio unit including an input and an output, the output coupled between the input and the other of the axial compression stage and the centrifugal compression stage.

10. The compressor of claim 9, further comprising (i) a first thrust bearing supporting a portion of the variable-ratio unit and (ii) a second thrust bearing supporting a portion of the second variable-ratio unit.

11. The compressor of claim 9, wherein each of the variable-ratio unit and the second variable-ratio unit is included in an infinitely variable transmission.

12. The compressor of claim 10, wherein each of the variable-ratio unit and the second variable-ratio unit includes one of a toroidal variator and a planetary ball variator.

13. A gas turbine engine comprising
a compressor including an axial compression stage and a centrifugal compression stage arranged aft of the axial compression stage along an engine axis, a turbine arranged aft of the centrifugal compression stage, the turbine including a single turbine stage coupled to each of the axial compression stage and the centrifugal compression stage to drive rotation of each of the axial compression stage and the centrifugal compression stage about the engine axis, and a variable-ratio unit coupled to the turbine and the compressor, the variable-ratio unit configured to transmit rotational power generated by the turbine about the engine axis to at least one of the axial compression stage and the centrifugal compression stage to drive rotation of the at least one of the axial compression stage and the centrifugal compression stage at various speeds offset from a turbine speed.

14. The gas turbine engine of claim 13, wherein the variable-ratio unit is arranged forward of the axial compression stage about the engine axis.

15. The gas turbine engine of claim 14, wherein the axial compression stage is coupled to the turbine through the variable-ratio unit for rotation about the engine axis at the various speeds offset from the turbine speed.

16. The gas turbine engine of claim 15, further comprising a thrust bearing supporting a portion of the variable-ratio unit and arranged forward of the axial compression stage.

\* \* \* \* \*